United States Patent
Park et al.

(10) Patent No.: US 8,489,078 B2
(45) Date of Patent: Jul. 16, 2013

(54) APPARATUS AND METHOD FOR PROVIDING AN EMERGENCY SERVICE IN A BROADBAND WIRELESS COMMUNICATION SYSTEM

(75) Inventors: Giwon Park, Gyeonggi-Do (KR); Kiseon Ryu, Gyeonggi-Do (KR); Heejeong Cho, Gyeonggi-Do (KR); Yongho Kim, Gyeonggi-Do (KR); Youngsoo Yuk, Gyeonggi-Do (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 13/503,717

(22) PCT Filed: Dec. 8, 2010

(86) PCT No.: PCT/KR2010/008757
§ 371 (c)(1),
(2), (4) Date: Apr. 24, 2012

(87) PCT Pub. No.: WO2011/074826
PCT Pub. Date: Jun. 23, 2011

(65) Prior Publication Data
US 2012/0208493 A1   Aug. 16, 2012

Related U.S. Application Data

(60) Provisional application No. 61/288,316, filed on Dec. 20, 2009, provisional application No. 61/287,196, filed on Dec. 17, 2009.

(30) Foreign Application Priority Data

Aug. 30, 2010   (KR) .................. 10-2010-0084404

(51) Int. Cl.
*H04M 3/42*   (2006.01)

(52) U.S. Cl.
USPC ................. 455/414.1; 455/404.1; 455/404.2; 455/435.1; 455/458

(58) Field of Classification Search
USPC ............. 455/404.1, 404.2, 414.1, 435.1, 458
See application file for complete search history.

(56) References Cited

U.S. PATENT DOCUMENTS

| 6,226,510 | B1 * | 5/2001 | Boling et al. ............ 455/404.2 |
| 8,090,342 | B2 * | 1/2012 | Xu et al. ................ 455/404.1 |
| 2005/0037728 | A1 * | 2/2005 | Binzel et al. ............ 455/404.1 |
| 2005/0159132 | A1 * | 7/2005 | Wright et al. ............ 455/404.1 |
| 2006/0089161 | A1 * | 4/2006 | Kim et al. ................ 455/458 |
| 2006/0154663 | A1 * | 7/2006 | Son et al. ............... 455/435.1 |

FOREIGN PATENT DOCUMENTS

| KR | 10-2009-0079471 | 7/2009 |
| KR | 10-2009-0079774 | 7/2009 |
| KR | 10-2009-0113165 | 10/2009 |

* cited by examiner

*Primary Examiner* — Manpreet Matharu
(74) *Attorney, Agent, or Firm* — McKenna Long & Aldridge LLP

(57) ABSTRACT

Disclosed is a method of allowing a terminal to provide an emergency service in a broadband wireless communication system, and the method may include receiving a first map message including an emergency service indicator; checking whether information indicating that emergency service information is transmitted is included in the received first map message; and receiving a first message including the emergency service information when the information indicating that emergency service information is transmitted is included therein as a result of the check, wherein the emergency service indicator is information indicating at least one of whether to transmit emergency service information and a transmission timing of the emergency service information.

10 Claims, 4 Drawing Sheets

[Fig. 1]
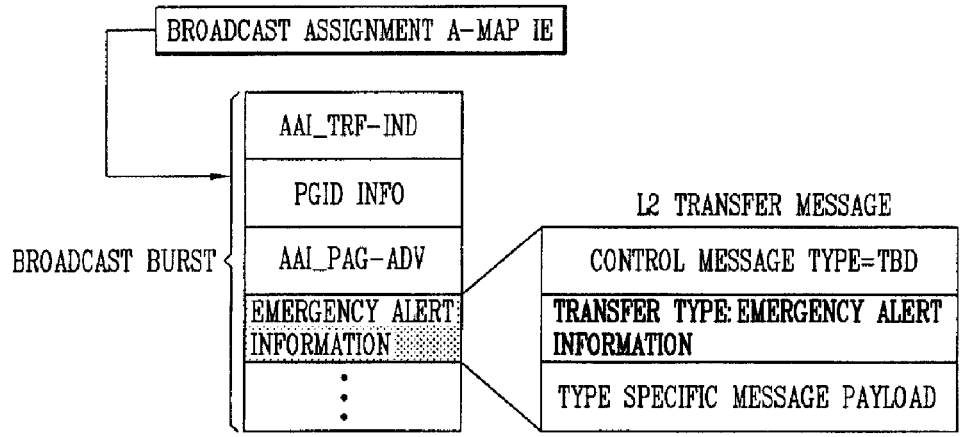
[Fig. 2]
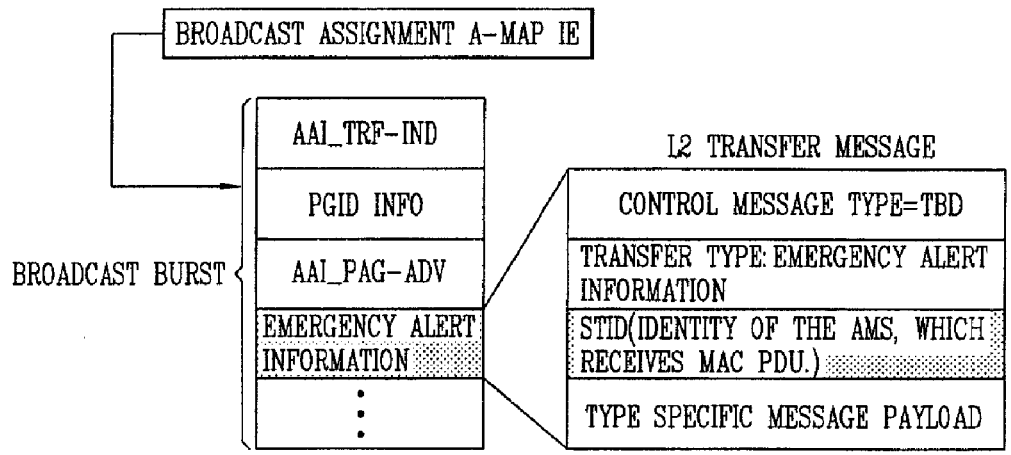
[Fig. 3]
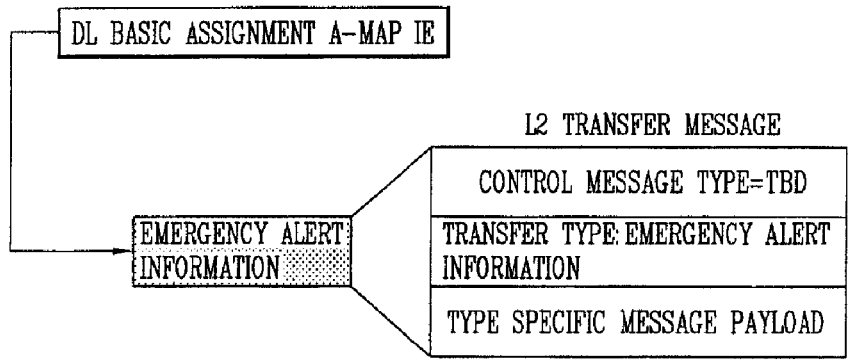

[Fig. 4]
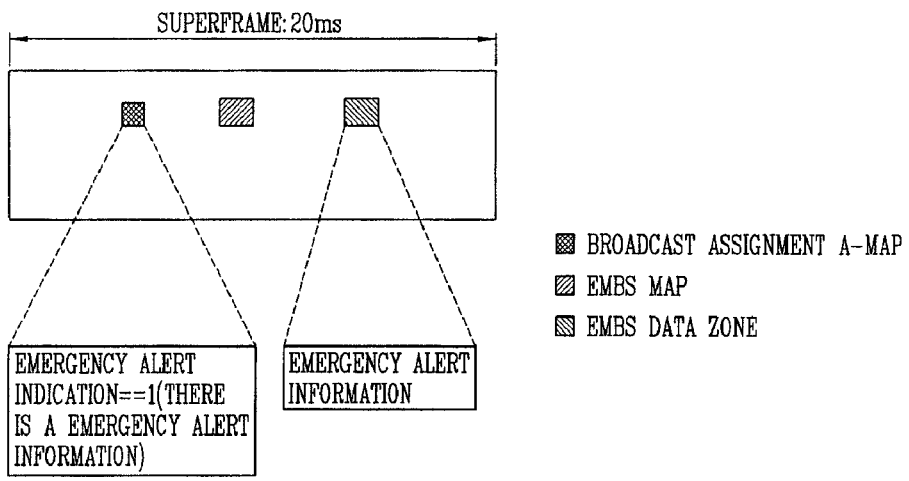
[Fig. 5]
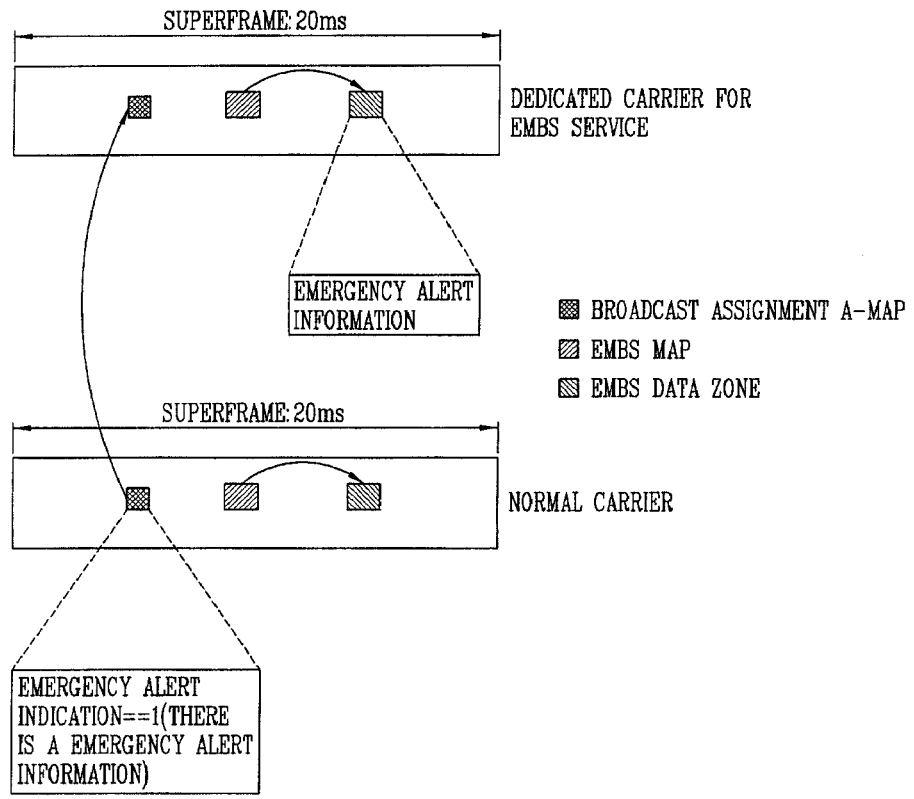

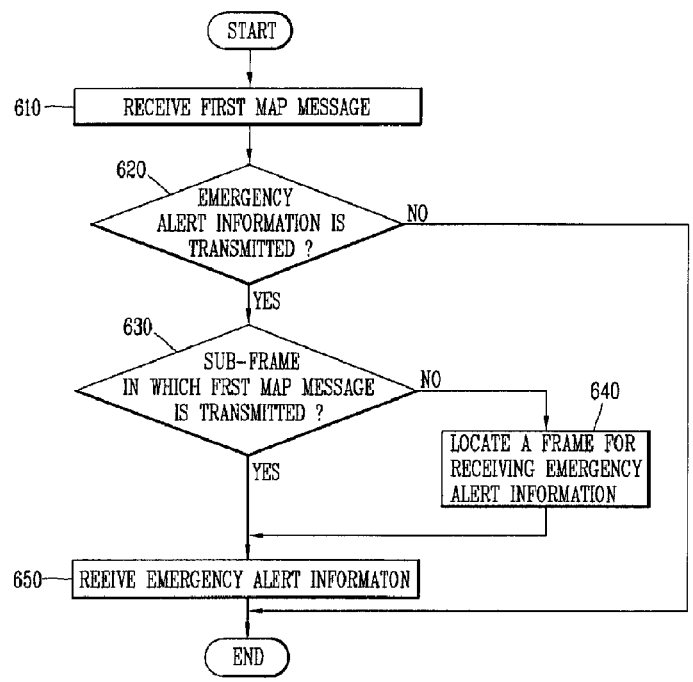
[Fig. 6]
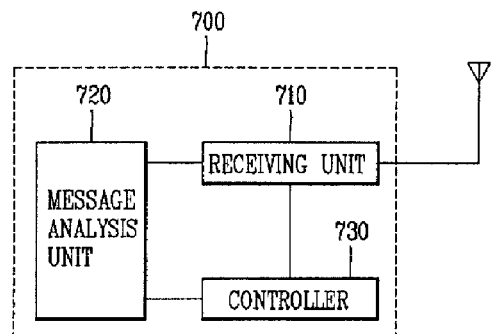
[Fig. 7]
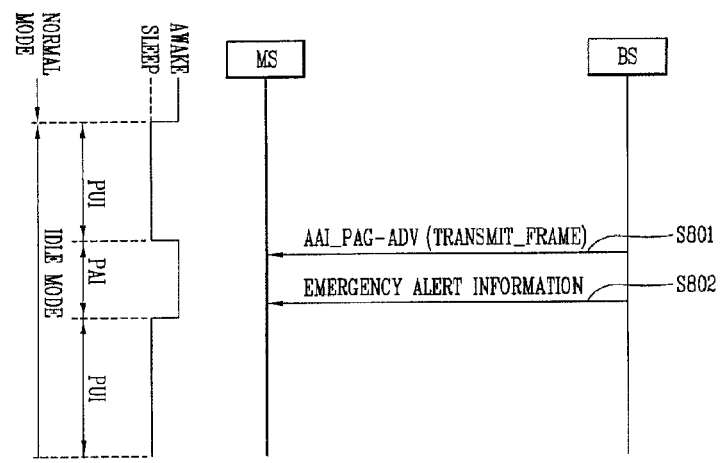
[Fig. 8a]

[Fig. 8b]
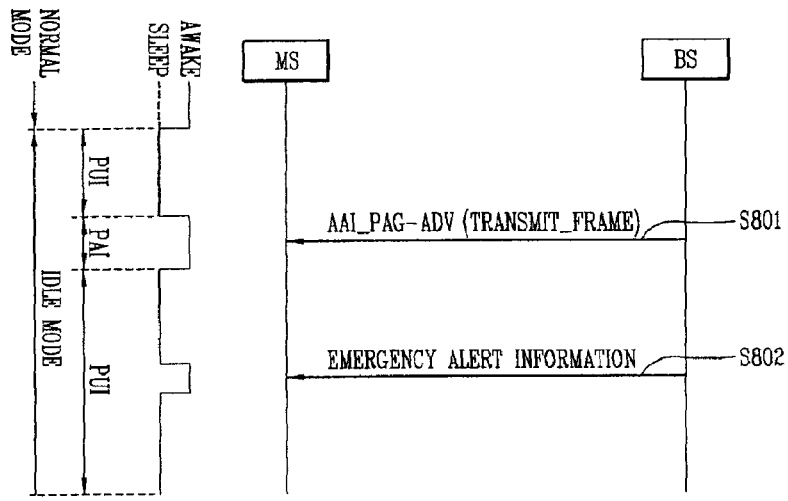
[Fig. 9a]
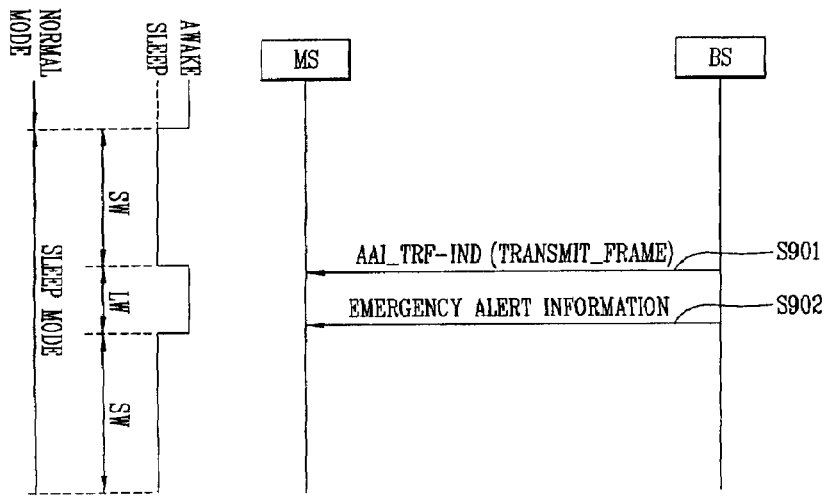
[Fig. 9b]
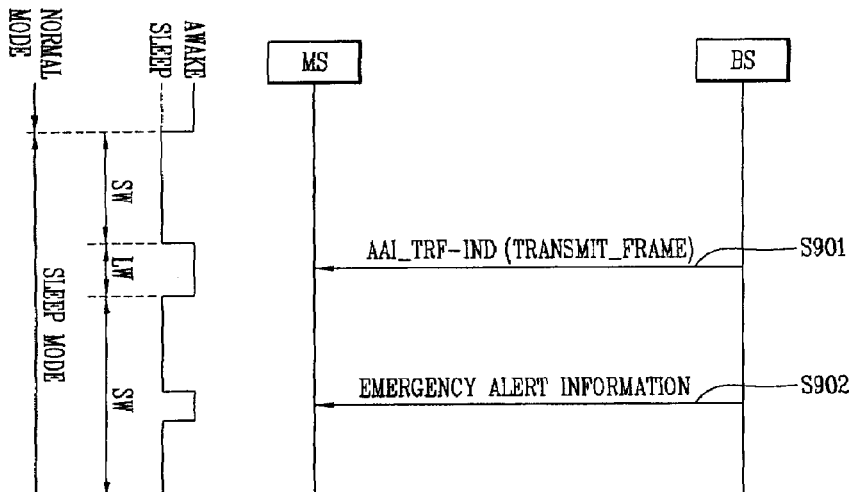

APPARATUS AND METHOD FOR PROVIDING AN EMERGENCY SERVICE IN A BROADBAND WIRELESS COMMUNICATION SYSTEM

This Application is a 35 U.S.C. §371 National Stage entry of International Application No. PCT/KR2010/008757, filed Dec. 8, 2010, and claims the benefit of U.S. Provisional Application No. 61/287,196, filed Dec. 17, 2009 and U.S. Provisional Application No. 61/288,316, filed Dec. 20, 2009, and Korean Application No. 10-2010-0084404, filed Aug. 30, 2010, all of which are incorporated by reference in their entirety herein.

TECHNICAL FIELD

The present disclosure relates to an apparatus and a method of providing an emergency service in a communication system.

BACKGROUND ART

Next generation communication systems are being developed in various forms of providing a high-speed, high-capacity service to mobile stations (hereinafter, referred to as "MS"). The representative examples of the next communication system may include an IEEE (Institute of Electrical and Electronics Engineers) 802.16 communication system and a mobile WiMAX (Worldwide Interoperability for Microwave Access) communication systems, and the like. Here, the Mobile WiMAX communication system is based on the IEEE 802.16 communication system, and the IEEE 802.16 communication system represents a communication system using the IEEE 802.16 standard.

Here, an emergency service proposed in the IEEE 802.16 communication system will be described as follows.

In general, an emergency service may include a wireless emergency rescue service (hereinafter, referred to as "WERS") and a wireless emergency alert service (hereinafter, referred to as "WEAS"), and the WERS and WEAS will be described respectively as follows.

First, the WERS is also referred to as an MS-triggered emergency service (hereinafter, referred to as "MS-triggered ES"), and may include a service for locating an MS to support safe rescue when emergency situations occur such as a fire, a crime, and the like. In case of WERS, the service is typically triggered by an MS and thus it may be referred to as a MS-triggered ES. The kinds of the WERS may include a voice-call service or the like such as a 911 service.

Second, the WEAS is also referred to as a base station (BS)-triggered emergency service (hereinafter, referred to as "BS-triggered ES"), and may include a service for supporting an emergency notification such as a rainstorm, an impending earthquake, a tidal wave, and the like to an MS existing in a particular geographical region. In case of WEAS, the service is typically triggered by a base station, and thus it may be referred to as a BS-triggered ES.

In the IEEE 802.16 communication system, it has been considered only to provide the WEAS. In recent years, however, in the IEEE 802.16 communication system, it is merely suggested an operation method capable of broadcasting information related to a timing of transmitting an emergency service message to the MS using a broadcast control pointer information element (IE) (hereinafter, referred to as "broadcast control pointer IE") message included in a downlink-map (DL-MAP) message.

DISCLOSURE OF INVENTION

Solution to Problem

The objective of the present disclosure is to provide a method and an apparatus for providing emergency service information through a message including information related to whether to transmit emergency service information.

A method of allowing a terminal to provide an emergency service in a broadband wireless communication system according to the present disclosure may include receiving a first map message including an emergency service indicator; checking whether information indicating that emergency service information is transmitted is included in the received first map message; and receiving a first message including the emergency service information when the information indicating that emergency service information is transmitted is included therein as a result of the check, wherein the emergency service indicator is information indicating at least one of whether to transmit emergency service information and a transmission timing of the emergency service information.

Furthermore, it is characterized in that the first map message may be a broadcast assignment map information element (Broadcast Assignment A-MAP IE) or downlink basic assignment map information element (DL Basic Assignment A-MAP IE).

Furthermore, it is characterized in that the first message may be a broadcast burst or layer 2 transfer message (L2 Transfer message).

Furthermore, it is characterized in that the first message may include an identifier for identifying an terminal that receives emergency service information, and the method may further include comparing whether an identifier included in the first message is identical to an identifier for an emergency service included in a ranging response message stored previously or received during a network entry procedure subsequent to receiving the first message; and checking emergency service information included in the first message or deleting the first message according to the comparison result.

Furthermore, it is characterized in that the method may further include transmitting a registration release request message for disconnecting the connection to a network to a base station to enter into an idle mode; and receiving a response message to the registration release request from the base station.

Furthermore, it is characterized in that at least one of the registration release request message or the registration release response message may include an idle mode retain information, and the idle mode retain information may be information indicating the retaining of an identifier for an emergency service included in a ranging response message stored previously or received during a network entry procedure.

Furthermore, it is characterized in that the method may further include comparing whether an identifier included in the first message is identical to an identifier for an emergency service included in a ranging response message stored previously or received during a network entry procedure subsequent to receiving the first message.

Furthermore, it is characterized in that the method may further include receiving an E-MBS (Enhanced-Multicast and Broadcast Service) map message when information indicating that emergency service information is transmitted is included in the received first map message.

Furthermore, it is characterized in that the method may further include switching from a carrier receiving the first map message to a dedicated carrier assigned for E-MBS when information indicating that emergency service information is transmitted is included in the received first map message; and receiving an E-MBS (Enhanced-Multicast and Broadcast Service) map message through the switched carrier.

Furthermore, it is characterized in that the method may further include checking whether information on the emergency service information transmission timing is included in the first map message; and determining a frame location for receiving the emergency service information according to the check result.

Furthermore, it is characterized in that the location of a frame for receiving the emergency service information may be implicatively determined by using an emergency service information parameter when the emergency service information is different from a sub-frame for receiving the first map message as a result of the check.

Furthermore, it is characterized in that the emergency service information parameter may be an identifier for identifying an terminal that receives emergency service information and a time region hash parameter used to determine a frame number of super frames for transmitting emergency service information.

Furthermore, a terminal for receiving emergency service information in a broadband wireless communication system according to the present disclosure may include a receiving unit configured to receive a first map message including an emergency service indicator and a first message including emergency service information; a message analysis unit configured to extract at least one of information indicating that the emergency service information is transmitted and information on a transmission timing of the emergency service information from the received first map message; and a controller configured to determine a location for receiving the first message based on the extracted information and control to receive the first message at the determined location.

According to the present disclosure, whether to transmit emergency service information and a transmission timing are informed in advance to a terminal, thereby reducing power consumption in case of a terminal being operated in a sleep mode or idle mode. Furthermore, emergency service information can be transmitted only to a specific group of terminals, thereby having an advantage of enhancing the overall system service performance, such as reducing the overhead of a base station.

BRIEF DESCRIPTION OF DRAWINGS

The accompanying drawings, which are included to provide a further understanding of the invention and are incorporated in and constitute a part of this specification, illustrate embodiments of the invention and together with the description serve to explain the principles of the invention.

In the drawings:

FIG. 1 is a view illustrating a method of transmitting emergency service information to a terminal according to a first embodiment of the present disclosure;

FIG. 2 is a view illustrating a method of transmitting emergency service information to a terminal according to a second embodiment of the present disclosure;

FIG. 3 is a view illustrating a procedure for receiving emergency alert information from a terminal according to a third embodiment of the present disclosure;

FIG. 4 is a view illustrating a method of receiving emergency alert information from a terminal according to a fourth embodiment of the present disclosure;

FIG. 5 is a view illustrating a method of receiving emergency alert information in the terminal according to a fifth embodiment of the present disclosure;

FIG. 6 is a flow chart illustrating an operation procedure for receiving emergency alert information in a terminal according to a sixth embodiment of the present disclosure;

FIG. 7 is an internal block diagram illustrating a terminal for receiving emergency alert information according to an embodiment of the present disclosure;

FIGS. 8a and 8b are flow charts illustrating a procedure in which a terminal wakes up at the location of a frame that emergency alert information is transmitted in an idle mode to receive emergency alert information according to a seventh embodiment of the present disclosure; and FIGS. 9a and 9b are flow charts illustrating a procedure in which a terminal wakes up at the location of a frame that emergency alert information is transmitted in a sleep mode to receive emergency alert information according to a seventh embodiment of the present disclosure.

MODE FOR THE INVENTION

Hereinafter, embodiments according to the present disclosure will be described in detail with reference to the accompanying drawings. In the following description, it should be noted that only a portion required to understand the operation according to the present disclosure will be described, and the description of the remaining portion will be omitted not to obscure the gist of the present disclosure.

According to the present disclosure, there is proposed an apparatus and a method of providing an emergency service in a communication system, for example, a communication system using the IEEE (Institute of Electrical and Electronics Engineers) 802.16 standard (hereinafter, referred to as "IEEE 802.16 communication system").

According to the present disclosure, though there is described an apparatus and a method of providing an emergency service using the IEEE 802.16 communication system as an example, the apparatus and method of providing an emergency service proposed by the present disclosure is also, of course, applicable to the IEEE 802.16 communication systems as well as to other communication systems.

In the following embodiments, the constituent elements and features of the present disclosure are combined with one another in a predetermined form. Each constituent element or feature thereof should be considered to be selective as unless otherwise particularly specified. Each constituent element or feature thereof may be implemented in the form of not being combined with any other constituent elements or features. Furthermore, an embodiment of the present disclosure may be also configured by combining some of the constituent elements and/or features. The sequence of the operations described in the embodiments of the present disclosure may be changed. Some of the configurations or features of any embodiment may be included in any other embodiments, or may be replaced with the configurations and features corresponding to the any other embodiments.

Embodiments of the present disclosure are described mainly in relation to the transmission and reception of data between a base station and a terminal. Here, the base station has also the meaning of a terminal node of a network, which directly performs communication with the terminal. In this disclosure, a specific operation described to be performed by a base station may be carried out by an upper node of the base station if necessary.

In other words, it should be understood that various operations carried out for communication with a terminal in a network comprised of a plurality of network nodes including a base station can be carried out by the base station or other network nodes except the base station. The term "base station" may be replaced by a term such as fixed station, Node B, eNode B (eNB), access point, or the like. Furthermore, the term "terminal" may be replaced by a term such as UE (user equipment), MS (terminal), MSS (mobile subscriber station), or the like.

Embodiments of the present disclosure may be implemented through various means. For example, embodiments of the present disclosure may be implemented by hardware, firmware, software, or any combination thereof.

In case of a hardware implementation, a method according to the embodiments of the present disclosure may be implemented by one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, or the like.

In case of a firmware or software implementation, a method according to the embodiments of the present disclosure may be implemented in the form of a module, procedure, function, or the like which performs the functions or operations as described above. The software codes may be stored in a memory unit to be driven by a processor. The memory unit may be located at an inner or outer portion of the processor to send and/or receive data to and/or from the processor by various publicly-known means.

Specific terms used herein are provided to help understanding of the present disclosure, and the use of those specific terms may be replaced with other terms without departing from the technical spirit of the present disclosure.

First Embodiment

According to a first embodiment of the present disclosure, there is provided a method of transmitting emergency service information, particularly, emergency alert information (Emergency Alert Information), to a terminal through a broadcast assignment information element (Broadcast Assignment A-MAP IE) and a layer 2 transfer message (L2 Transfer message).

First, in the above, the layer 2 transfer message (L2 Transfer message) is referred to as AAI L2-XFER, which denotes a typical MAC control message. The message acts as a typical service carrier to provide various services.

FIG. 1 is a view illustrating a method of transmitting emergency service information to a terminal according to a first embodiment of the present disclosure.

Hereinafter, as an example of emergency service information, emergency alert information will be described, for example.

First, the terminal receives a first map message including an emergency alert indicator from a base station. Here, the first map message may be a broadcast assignment A-MAP message (Broadcast Assignment A-MAP message).

Furthermore, the emergency alert indicator is an indicator indicating whether to transmit emergency alert information. In other words, the emergency alert indicator indicates whether or not emergency alert information is transferred to a terminal being operated in an idle mode, sleep mode, or normal mode.

Furthermore, if the emergency alert information indicates that emergency alert information is transmitted (for example, when emergency alert indication field is set to "1"), then the first map message may further include an emergency alert information transmission frame parameter (or field) indicating a transmission timing (frame or sub-frame) of emergency alert information.

Here, the emergency alert information transmission frame parameter indicates a relative value of a sub-frame or frame number at which the base station starts to transmit emergency alert information.

Furthermore, if the emergency alert information transmission frame parameter is set to "0", then it indicates that emergency alert information is transmitted at a current sub-frame or frame in which a traffic indication message is transmitted.

Here, the emergency alert information transmission frame parameter may be included in a MAC Control message, a MAP, a header, or the like to be transmitted.

Next, it is checked whether the received first map message includes information indicating that the emergency alert information (Emergency Alert Information) is transmitted. As an example, it indicates that emergency alert information (Emergency Alert Information) is not transmitted if the emergency alert indicator (Emergency Alert Indicator) is set to "0", and it indicates that Emergency Alert Information is transmitted if the emergency alert indicator (Emergency Alert Indicator) is set to "1".

As a result of the check, if information indicating that the emergency alert information is transmitted is included therein, in other words, if the emergency alert indicator is set to "1", then a first message including the emergency alert information is received from the base station. The first message may be transmitted in a sub-frame in which the first map message is transmitted.

Furthermore, the terminal may receive the first message from a frame or sub-frame specified in the emergency alert information transmission frame parameter.

Here, if it is recognized that emergency alert information is transmitted through a Broadcast Assignment A-MAP message in a paging or listening interval, then the terminal being operated in an idle mode or sleep mode maintains the listening mode until receiving emergency alert information.

Here, if the emergency alert information is transmitted in a paging unavailable interval or sleep window interval, then the terminal may wake up at a timing at which emergency alert information is transmitted, and receive emergency alert information from the base station, and then enter into the paging unavailable interval or sleep window interval again.

Furthermore, the emergency alert information may be transmitted as a broadcast burst to a sub-frame in which Broadcast Assignment A-MAP message is transferred.

In the above, the first message may be a layer 2 transfer message (L2 Transfer message). The L2 transfer message is referred to as AAI L2-XFER, which denotes a typical MAC control message. The message acts as a typical service carrier to provide various services.

The following Table 1 is an example illustrating the format of a Broadcast Assignment A-MAP IE when an emergency alert indicator and an emergency alert information transmission frame parameter are included in the Broadcast Assignment A-MAP IE to be transmitted.

TABLE 1

| Syntax | Size in bits | Description/Notes |
|---|---|---|
| ... | ... | ... |
| Emergency | 1 | 0 = There is no emergency information |

TABLE 1-continued

| Syntax | Size in bits | Description/Notes |
|---|---|---|
| Alert Indicator | | 1 = There is emergency information. When the AMS detects that Emergency Alert Indicator bit is set to 1, AMS in Connected Mode, Idle Mode or Sleep Mode shall receive emergency service message |
| If(Emergency Alert Indicator==1){ | | |
| Emergency Alert Information Transmission Frame | TBD | A relative value from the current subframe or frame number in which a ABS will start to transmit Emergency Alert Information. '0' means that the Emergency Alert Information is transmitted in current subframe or frame which this AAI_PAG-ADV is transmitted. |

Furthermore, the following Table 2 is an example illustrating the format of a L2 Transfer message when emergency alert information is included in the L2 Transfer message to be transmitted.

TABLE 2

Control Message Type = TBD
Transfer-Type: Emergency Alert Information
Sub-Type
Type specific message payload Referring to Table 2, it is seen that Transfer-Type is added for emergency alert information. The Transfer-Type indicates downlink emergency alert information.

If the Transfer-Type is "8" (Transfer-Type=8) in the above Table 2, then it may be a message in which emergency alert information is transmitted (Transfer-Type=8; Emergency Alert Information).

The following Table 3 is an example illustrating the format of another Broad Assignment A-MAP IE according to an embodiment of the present disclosure.

TABLE 3

| Syntax | Size in bits | Description/Notes |
|---|---|---|
| Broadcast Assignment A-MAP IE( ){ | — | |
| A-MAP IE Type | 4 | Broadcast Assignment A-MAP IE |
| ... | ... | ... |
| Broadcast Message Type | 4 | Indicates the type of message. 0x0: Emergency Alert Information 0x1: AAI_NBR-ADV messge 0x2: AAI_SCD message 0x3~0xF: Reserved |
| for(i=0;i<3;++){ if(Broadcast Message Type[i]==1){ | | |
| Transmission_Frame | TBD | A relative value from the current subframe or frame number in which a ABS will start to transmit Emergency Alert Information. '0' means that the Emergency Alert Information is transmitted in current subframe or frame which this AAI_PAG-ADV is transmitted. |
| ... | ... | ... |

Referring to Table 3, if Broadcast Message Type included in broadcast assignment A-MAP IE is set to "1", for example, (i.e., Broadcast Message Type indicates a neighbor advertising message (AAI_NBR-ADV message)), then the neighbor advertising message includes an emergency alert information transmission frame parameter indicating an emergency alert information transmission timing.

Second Embodiment

According to a second embodiment of the present disclosure, there is provided a method of transmitting emergency alert information to the terminal through Broadcast Assignment A-MAP IE, Multicast STID, and a L2 Transfer message.

FIG. 2 is a view illustrating a method of transmitting emergency service information to a terminal according to a second embodiment of the present disclosure.

The emergency alert information may be transmitted only to terminals in a specific group within a base station region. In this case, the base station may include a multicast terminal identifier (Multicast STID) in an L2 Transfer message for the use of identifying a terminal receiving the first message. In other words, a bit for terminal identification is added thereto.

Subsequent to receiving an L2 Transfer message transmitted from the base station, the terminal compares a multicast terminal identifier (Multicast STID) included in the received L2 Transfer message with a multicast terminal identifier (Multicast STID) stored previously or assigned through a ranging response message (REG-RSP message) during a network entry procedure.

According to the comparison result, the received L2 Transfer message will be processed. In other words, emergency alert information included in the L2 Transfer message is checked if the multicast terminal identifiers (Multicast STIDs) are identical to each other, and the received L2 Transfer message is abandoned if the multicast terminal identifier (Multicast STID) are not identical to each other.

In the above, if the terminal receives a multicast terminal identifier (Multicast STID) through a ranging response message received during a network entry procedure, then the ranging response message includes an emergency alert information parameter. The emergency alert information parameter indicates an identifier assigned to the terminal for emergency alert services.

The following Table 4 is an example illustrating the format of a L2 transfer message when an identifier of the terminal for receiving emergency alert information is included in the L2 transfer message to be transmitted.

TABLE 4

Control Message Type = TBD
Transfer-Type: Emergency Alert Information
Sub-Type: STID (Identity of the AMS, which receives MAC PDU)
Type specific message payload Referring to Table 4, it is seen that Transfer-Type indicating emergency alert information and Sub-Type indicating an identifier for identifying a terminal receiving emergency alert information are added thereto.

The following Table 5 is an example illustrating the format of an AAI_RNG_RSP Message when an emergency alert information parameter is included in the AAI_RNG_RSP Message to be transmitted.

TABLE 5

| Syntax | Size in bits | Description/Notes |
|---|---|---|
| ... | ... | ... |
| Emergency Alert Information Parameter | ... | Multicast STID |
| ... | ... | ... |

In particular, the terminal being operated in an idle mode disconnects the connection to a network, and thus it does not maintain Multicast STID stored previously or received through a ranging response message during the network entry procedure, and as a result, it may not receive emergency alert information transmitted from the base station.

Accordingly, for this purpose as an example in this present disclosure, when the terminal is operated in an idle mode, an emergency alert information parameter is added to the idle mode retain information to maintain the Multicast STID stored previously or received through a ranging response message during the network entry procedure. In other words, the terminal being operated in an idle mode and a base station paging controller maintain an emergency alert information parameter.

The idle mode retain information may be included in any one of a registration release request message transmitted from the terminal to a network and a registration release response message transmitted from the network to the terminal in response to this.

The following Table 6 is an example illustrating a case when the idle mode retain information is included in a registration release request message or registration release response message (DREG-REQ/RSP) to be transmitted.

TABLE 6

| Name | Type | Length | Value | Scope |
|---|---|---|---|---|
| ... | ... | ... | ... | ... |
| Idle Mode Retain Information | TBD | TBD | Bit x: Retain Emergency Alert Information parameter associated with AAI_RNG_RSP message or reserved Multicast STID for Emergency Alert Service | DREG-REQ/RSP |
| ... | ... | ... | ... | ... |

Referring to Table 6, it is seen that idle mode retain information is included in a registration release request or registration release response message transmitted and/or received to and/or from the base station to enter into an idle mode.

Third Embodiment

According to a third embodiment of the present disclosure, there is provided a method of transmitting emergency alert information (Emergency Alert Information) to the terminal through a downlink basic assignment map information element (DL Basic Assignment A-MAP IE) and a layer 2 transfer message (L2 Transfer message).

First, the layer 2 transfer message (L2 Transfer message) is referred to as AAI L2-XFER, which denotes a typical MAC control message. The message acts as a typical service carrier to provide various services.

FIG. 3 is a view illustrating a procedure for receiving emergency alert information from a terminal according to a third embodiment of the present disclosure.

First, the terminal receives a ranging response message (RNG-RSP) including an emergency alert information parameter during the network entry procedure. The emergency alert information parameter is an identifier assigned to the terminal for emergency alert information. Also, the emergency alert information parameter may be previously stored in the terminal.

The identifier assigned to the terminal may be Multicast STID or Broadcast STID.

Next, the terminal receives a first map message including an emergency alert indicator from the base station. Here, the first map message may be a downlink basic assignment map information element (DL Basic Assignment A-MAP IE). If the DL Basic Assignment A-MAP IE is transmitted to all terminals, then the CRC within the DL Basic Assignment A-MAP is masked with Broadcast STID. Furthermore, if it is transmitted to a specific terminal group, then the CRC within the DL Basic Assignment A-MAP is masked with Multicast STID. As a result, the terminal may know whether emergency alert information is to be transmitted through Multicast STID stored previously or received during the network entry procedure.

Furthermore, the emergency alert indicator is an indicator indicating whether to transmit emergency alert information. In other words, the emergency alert indicator indicates whether or not emergency alert information is transferred to the terminal being operated in an idle mode, sleep mode, or normal mode.

Next, it is checked whether the received first map message includes information indicating that the emergency alert information (Emergency Alert Information) is transmitted. As an example, it indicates that emergency alert information is not transmitted if the emergency alert indicator (Emergency Alert Indicator) is set to "0", and it indicates that emergency alert information is transmitted if the indicator is set to "1".

As a result of the check, if information indicating that the emergency alert information is transmitted is included therein, then a first message including the emergency alert information is received. Here, if it is recognized that emergency alert information is transmitted through a DL Basic Assignment A-MAP message in a paging or listening interval, then the terminal being operated in an idle or sleep mode maintains the listening mode until receiving emergency alert information.

Furthermore, the emergency alert information may be included as a broadcast burst in a sub-frame in which a DL Basic Assignment A-MAP message is transferred to be transmitted.

In the above, the first message may be a layer 2 transfer message (L2 Transfer message). The L2 Transfer message is referred to as AAI L2-XFER, which denotes a typical MAC control message. The message acts as a typical service carrier to provide various services.

In particular, the terminal being operated in an idle mode disconnects the connection to a network, and thus it does not maintain Multicast STID stored previously or received through a ranging response message during the network entry procedure, and as a result, it may not receive emergency alert information transmitted from the base station.

Accordingly, for this purpose as an example in this present disclosure, if the terminal is operated in an idle mode, then an emergency alert information parameter is added to the idle mode retain information to maintain the Multicast STID stored previously or received through a ranging response message during the network entry procedure. In other words, the terminal being operated in an idle mode and a base station paging controller maintain an emergency alert information parameter.

The idle mode retain information may be included in any one of a registration release request message transmitted from the terminal to a network and a registration release response message transmitted from the network to the terminal in response to this.

An example of the format of a registration release request or response message including the idle mode retain information may be as illustrated in the above Table 5.

Fourth Embodiment

According to a fourth embodiment of the present disclosure, there is provided a method of transferring emergency alert information through an E-MBS (Enhanced-Multicast and Broadcast Service) data zone.

FIG. 4 is a view illustrating a method of receiving emergency alert information from a terminal according to a fourth embodiment of the present disclosure.

First, the terminal receives a first map message including an emergency alert indicator from a base station. Here, the first map message may be a broadcast assignment A-MAP message (Broadcast Assignment A-MAP message). For example, the format of the broadcast assignment A-MAP message (Broadcast Assignment A-MAP message) including the emergency alert indicator to be transmitted may be as illustrated in the above Table 1. Furthermore, the emergency alert indicator is an indicator indicating whether to transmit emergency alert information. In other words, the emergency alert indicator indicates whether or not emergency alert information is transferred to the terminal being operated in an idle mode, sleep mode, or normal mode.

Next, it is checked whether the received first map message includes information indicating that the Emergency Alert Information is transmitted. As an example, it indicates that Emergency Alert Information is not transmitted if the Emergency Alert Indicator is set to "0", and it indicates that Emergency Alert Information is transmitted if the indicator is set to "1".

As a result of the check, if information indicating that the emergency alert information is transmitted is included therein, in other words, if the emergency alert indicator is set to "1" as an example, then an E-MBS map message is received. The emergency alert information is received from the E-MBS data zone through the received E-MBS map message.

Fifth Embodiment

According to a fifth embodiment of the present disclosure, there is provided a method of allowing the terminal to receive emergency alert information from the base station supporting multicarrier.

FIG. 5 is a view illustrating a method of receiving emergency alert information in a terminal according to a fifth embodiment of the present disclosure.

First, the terminal receives a first map message including an emergency alert indicator from a base station. Here, the first map message may be a broadcast assignment A-MAP message (Broadcast Assignment A-MAP message). For example, the format of the broadcast assignment A-MAP message (Broadcast Assignment A-MAP message) including the emergency alert indicator to be transmitted may be as illustrated in the above Table 1. Furthermore, the emergency alert indicator is an indicator indicating whether to transmit emergency alert information. In other words, the emergency alert indicator indicates whether or not emergency alert information is transferred to the terminal being operated in an idle mode, sleep mode, or normal mode.

Next, it is checked whether the received first map message includes information indicating that the Emergency Alert Information is transmitted. As an example, it indicates that Emergency Alert Information is not transmitted if the Emergency Alert Indicator is set to "0", and it indicates that Emergency Alert Information is transmitted if the indicator is set to "1".

As a result of the check, if information indicating that the emergency alert information is transmitted is included therein, in other words, if the emergency alert indicator is set to "1" as an example, then the terminal is switched from a carrier currently receiving the first map message to a dedicated carrier assigned for E-MBS. In the above, the dedicated carrier assigned for E-MBS is informed in advance to the terminal by the base station.

Next, an E-MBS map message received through the switched dedicated carrier is checked, and then the emergency alert information is received from the E-MBS data zone.

As a result, according to the foregoing embodiment, it is not necessary for the base station to transfer emergency alert information via all active carriers. In other words, the base station transfers emergency alert information only through a dedicated carrier, thereby reducing the resource overhead of the base station.

Sixth Embodiment

According to a sixth embodiment of the present disclosure, there is provided a method of determining the location of a frame for receiving emergency alert information.

FIG. 6 is a flow chart illustrating an operation procedure for receiving emergency alert information in a terminal according to a sixth embodiment of the present disclosure.

First, the terminal receives a first map message including an emergency alert indicator from a base station (610). Here, the first map message may be a broadcast assignment A-MAP message (Broadcast Assignment A-MAP message). Furthermore, the emergency alert indicator is an indicator indicating whether to transmit emergency alert information and a transmission timing of the emergency alert information. In other words, the emergency alert indicator indicates whether or not emergency alert information is transferred to the terminal being operated in an idle mode, sleep mode, or normal mode. Furthermore, the emergency alert indicator includes information on a timing at which the emergency alert information is transmitted when the emergency alert information is transmitted. In other words, it indicates whether or not the emergency alert information is transmitted in a sub-frame in which the first map message is transmitted (620).

For example, the emergency alert indicator may be represented with two bits, and if the indicator is set to "0b10", then it indicates that the emergency alert information is not transmitted in a sub-frame in which the first map message is transmitted. If the indicator is set to "0b11", then it indicates that the emergency alert information is transmitted in a sub-frame in which the first map message is transmitted.

The following Table 7 is an example illustrating the format of a broadcast assignment A-MAP IE when an emergency alert indicator is included in the broadcast assignment A-MAP IE to be transmitted.

TABLE 7

| Syntax | Size in bits | Description/Notes |
|---|---|---|
| ... | ... | ... |
| Emergency Alert Indicator | 2 | 0 = There is no emergency information<br>1 = There is emergency information<br>3 = Emergency information is not transmitted in current subframe<br>4 = Emergency information is transmitted in current subframe<br>When the AMS detects that Emergency Alert Indicator bit is set to 1, AMS in Connected Mode, Idle Mode or Sleep Mode shall receive emergency service message |
| ... | ... | ... |

The following Table 8 is an example illustrating the format of AAI_RNG_RSP Message when the emergency alert indicator is included in the AAI_RNG_RSP Message to be transmitted.

TABLE 8

| Syntax | Size in bits | Description/Notes |
|---|---|---|
| ... | ... | ... |
| Emergency Alert Information Parameter | | Multicast STID: Indentifier for Emergency Alert Information in connected mode and sleep mode AMS<br>M: Time domain hash parameter(1~4) used to determine the frame number of a superframe for emergency alert information transmission of an AMS<br>M = 0: There is no emergency information |
| ... | ... | ... |

Next, the terminal checks the received first map message, and if an emergency alert information is not transmitted in the sub-frame in which the first map message is transmitted (630), then the terminal determines the location of a frame in which the emergency alert information is transmitted (640).

The location of a frame in which the emergency service information is transmitted may be implicitly determined by using an emergency service information parameter through the following equations 1 and 2.

The emergency alert information parameter may be included in a ranging response message (RNG-RSP message) received from the base station during a network entry procedure of the terminal. Furthermore, the emergency alert information parameter indicates an identifier (Multicast STID) assigned to the terminal for emergency alert information and a time region hash parameter (M) used to determine a frame number of super frames for transmitting emergency service information.

The time region hash parameter (M) may have a value of 1 through 4. Here, for example, if M=0, then the may know that an emergency alert information is not transmitted from the base station. Accordingly, in this case, a first map message transmitted from the base station may not be received.

Equation 1

Multicast STID modulo M==frame in which the base station transmits emergency alert information (when the CRC within a Broadcast Assignment A-MAP message is masked with Multicast STID)

Equation 2

Broadcast STID modulo M==frame in which the base station transmits emergency alert information (when the CRC within a Broadcast Assignment A-MAP message is masked with Broadcast STID)

In other words, if it is checked that an emergency alert information is not transmitted in a sub-frame in which the first map message is transmitted, then the terminal may know the location of a frame in which the emergency alert information is transmitted according to the equations 1 and 2. The terminal may implicitly know that an emergency alert information is transmitted in a frame subsequent to the frame in which the first map message is received.

The terminal receives emergency alert information according to the determined location (650).

In particular, the terminal being operated in an idle mode disconnects the connection to a network, and thus it does not maintain an emergency alert information parameter, i.e., Multicast STID, stored previously or received through a ranging response message during the network entry procedure. As a result, it may not receive emergency alert information transmitted from the base station.

Accordingly, for this purpose as an example in this present disclosure, when the terminal is operated in an idle mode, an emergency alert information parameter is added to the idle mode retain information to maintain the Multicast STID stored previously or received through a ranging response message during the network entry procedure. In other words, the terminal being operated in an idle mode and a base station paging controller maintain an emergency alert information parameter.

The idle mode retain information may be included in any one of a registration release request message transmitted from the terminal to a network and a registration release response message transmitted from the network to the terminal in response to this.

FIG. 7 is an internal block diagram illustrating the terminal for receiving emergency alert information according to an embodiment of the present disclosure.

The terminal 700 may include a receiving unit 710, a message analysis unit 720, and a controller 730.

First, the receiving unit 710 receives a first message including a first map message and an emergency alert indicator. Here, the first map message may be a broadcast assignment A-MAP message (Broadcast Assignment A-MAP message). Furthermore, the emergency alert indicator is an indicator indicating whether to transmit emergency alert information. In other words, the emergency alert indicator indicates whether or not emergency alert information is transferred to the terminal being operated in an idle mode, sleep mode, or normal mode.

Furthermore, in the above, the first message may be a L2 transfer message. The L2 transfer message is referred to as AAI L2-XFER, which denotes a typical MAC control message. Furthermore, the message acts as a typical service carrier to provide various services.

The message analysis unit 720 extract at least one of information indicating that the emergency service information is transmitted and information on a transmission timing of the emergency service information from the received first map message.

The controller 730 determines a location for receiving the first message based on the extracted information and controls to receive the first message in the determined frame.

The location of a frame in which the emergency service information is transmitted may be implicatively determined by using an emergency service information parameter through the following equations 1 and 2.

The emergency alert information parameter may be included in a ranging response message (RNG-RSP message) received from the base station during a network entry procedure of the terminal. Furthermore, the emergency alert information parameter indicates an identifier (Multicast STID) assigned to the terminal for emergency alert information and a time region hash parameter (M) used to determine a frame number of super frames for transmitting emergency service information.

Seventh Embodiment

According to a seventh embodiment of the present disclosure, there is provided a method of notifying the location of a frame in which emergency alert information (Emergency Alert Information) is transmitted to the terminal in an idle mode or sleep mode.

Idle Mode

FIG. 8 is a flow chart illustrating a procedure in which a terminal wakes up at the location of a frame that emergency alert information is transmitted in an idle mode to receive emergency alert information according to a seventh embodiment of the present disclosure.

FIG. 8a illustrates a case when emergency alert information is transmitted from the base station in a paging available interval (PAI), and FIG. 8b illustrates a case when emergency alert information is transmitted in a paging unavailable interval (PUI).

First, the terminal receives a paging advertising message (AAI_PAG-ADV) from the base station in the paging available interval (PAI) in an idle mode (S801).

The paging advertising message includes an emergency alert information transmission frame (Emergency Alert Information Transmission Frame) parameter indicating a timing at which emergency alert information is transmitted. Here, the emergency alert information transmission frame parameter may be included in a MAC Control message, a MAP, a header, or the like as well as in the paging advertising message to be transmitted.

Here, the emergency alert information transmission frame parameter indicates a relative value of a sub-frame or frame number at which the base station starts to transmit emergency alert information.

Furthermore, if the emergency alert information transmission frame parameter is set to "0", then it indicates that emergency alert information is transmitted at a current sub-frame or frame in which a paging advertising message is transmitted.

The terminal extracts emergency alert information transmission frame information from a paging advertising message received from the base station to check a frame or sub-frame in which emergency alert information is transmitted from the base station. Here, the terminal checks a frame or sub-frame in which emergency alert information is transmitted when an emergency alert indication field included in the paging advertising message is set to "1", for example.

Next, if the emergency alert indication bit included in the paging advertising message is set to "1" (i.e., if it is indicated that emergency alert information is transmitted from the base station), then the terminal wakes up at an offset location specified in the transmission frame (Transmit_Frame) parameter to receive emergency alert information (Emergency Alert Information) transmitted from the base station (S802).

As illustrated in FIG. 8a, if the interval in which the terminal receives emergency alert information from the base station is located within the paging available interval in an idle mode, then the terminal may receive emergency alert information transmitted from the base station at the offset location.

However, as illustrated in FIG. 8b, if the interval in which the terminal receives emergency alert information from the base station (interval in which the terminal wakes up) is located within the paging unavailable interval in an idle mode, then the terminal wakes up at an offset location specified in the transmission frame parameter to receive emergency alert information from the base station, and then enters into the paging unavailable interval.

In other words, the terminal wakes up at an offset location specified in the transmission frame parameter in the paging unavailable interval to receive emergency alert information from the base station, and then enters into the paging unavailable interval, thereby reducing the power consumption of the terminal.

The following Table 9 is an example illustrating the format of a AAI_PAG-ADV message including an emergency alert information transmission frame parameter.

TABLE 9

| Name | Value | Usage |
|---|---|---|
| AAI_PAG-ADV message( ){ . . . | | |
| Emergency Alert Indication | 0 = There is no emergency information<br>1 = There is emergency information | If the emergency alert indicator is set to '1', the AMS shall decode the A-A-MAP to obtain the emergency information. |
| Emergency Alert Information Transmission Frame | TBD | A relative value from the subframe or frame number in which a ABS will start to transmit Emergency Alert Information. '0' means that the Emergency Alert Information is transmitted in current subframe or frame which this AAI_PAG-ADV is transmitted. |
| } | | |

Sleep Mode

FIG. 9 is a flow chart illustrating a procedure in which the terminal wakes up at the location of a frame that emergency alert information is transmitted in a sleep mode to receive emergency alert information according to a seventh embodiment of the present disclosure.

FIG. 9a illustrates a case when emergency alert information is transmitted from the base station in a listening window (LW) interval, and FIG. 9b illustrates a case when emergency alert information is transmitted from the base station in a sleep window (SW) interval.

First, the terminal receives a traffic indication message (AAI_TRF-IND message) in the listening window interval in a sleep mode (S901).

The traffic indication message includes an emergency alert indication parameter indicating whether to transmit emergency alert information is transmitted. The emergency alert indication parameter indicates that emergency alert information is not transmitted from the base station if it is set to "0", and indicates that emergency alert information is transmitted from the base station if it is set to "1".

Furthermore, the traffic indication message includes an emergency alert information transmission frame (Emergency Alert Information Transmission Frame) parameter indicating a timing at which emergency alert information is transmitted.

Here, the emergency alert information transmission frame parameter indicates a relative value of a sub-frame or frame number at which the base station starts to transmit emergency alert information.

located within the sleep window interval, then the terminal wakes up at an offset location specified in the transmission frame parameter to receive emergency alert information from the base station, and then enters into the sleep mode interval.

In other words, the terminal receives emergency alert information from the base station in the sleep window interval, and then enters into the sleep window interval again, thereby reducing the power consumption.

The following Table 10 is an example illustrating the format of a AAI_TRF-IND message including an emergency alert information transmission frame parameter.

TABLE 10

| Name | Value | Usage |
| --- | --- | --- |
| AAI_TRF-IND message( ){ ... | | |
| Emergency Alert Indication | 0 = There is no emergency information<br>1 = There is emergency information | If the emergency alert indicator is set to '1', the AMS shall decode the A-A-MAP to obtain the emergency information. |
| Emergency Alert Information Transmission Frame | TBD | A relative value from the subframe or frame number in which a ABS will start to transmit Emergency Alert Information.<br>'0' means that the Emergency Alert Information is transmitted in current subframe or frame which this AAI_TRF-IND is transmitted. |
| } | | |

Furthermore, if the emergency alert information transmission frame parameter is set to "0", then it indicates that emergency alert information is transmitted at a current sub-frame or frame in which a traffic indication message is transmitted.

Here, the emergency alert indication parameter and emergency alert information transmission frame parameter may be included in a MAC Control message, a MAP, a header, or the like as well as in the traffic indication message to be transmitted.

The terminal extracts emergency alert information transmission frame information from a traffic indication message received from the base station to check a frame or sub-frame in which emergency alert information is transmitted from the base station. Here, the terminal checks a frame or sub-frame in which emergency alert information is transmitted when an emergency alert indication field included in the traffic indication message is set to "1", for example.

Next, if the emergency alert indication bit included in the traffic indication message is set to "1" (i.e., if it is indicated that emergency alert information is transmitted from the base station), then the terminal wakes up at an offset location specified in the transmission frame (Transmit_Frame) parameter to receive emergency alert information (Emergency Alert Information) transmitted from the base station (S902).

As illustrated in FIG. 9a, if the offset location specified in the transmission frame parameter, i.e., the sub-frame or frame in which the terminal receives emergency alert information (the interval in which the terminal wakes up) is located within the listening window interval in an idle mode, then the terminal receives emergency alert information transmitted from the base station at the offset location.

However, as illustrated in FIG. 9b, if the offset location specified in the transmission frame parameter, i.e., the sub-frame or frame in which the terminal receives emergency alert information (the interval in which the terminal wakes up) is

The invention claimed is:

1. A method of operating a terminal to provide an emergency service in a broadband wireless communication system, the method comprising:
   receiving, from a base station, a first map message including an emergency service indicator which includes first information and second information, the first information indicating whether or not emergency service information is transmitted and the second information indicating whether or not the emergency service information is transmitted in a sub-frame in which the first map message is transmitted;
   checking whether or not the emergency service information is transmitted in the sub-frame in which the first map message is transmitted based on the second information;
   determining a location of a frame in which the emergency service information is transmitted based on an emergency service information parameter, if the second information indicates that the emergency service information is not transmitted in the sub-frame in which the first map message is transmitted; and
   receiving, from the base station, a first message including the emergency service information in the sub-frame in which the first map message is transmitted or in the frame determined based on the emergency service information parameter.

2. The method of claim 1, wherein the first map message is a broadcast assignment advanced-map information element or downlink basic assignment advanced-map information element.

3. The method of claim 1, wherein the first message is a broadcast burst or layer 2 transfer message.

4. The method of claim 3, wherein the first message comprises an identifier for identifying an terminal that receives emergency service information, and the method further comprises:

comparing whether an identifier included in the first message is identical to an identifier stored previously or an identifier for an emergency service included in a ranging response message received during a network entry procedure subsequent to receiving the first message; and
checking emergency service information included in the first message or deleting the first message according to the comparison result.

5. The method of claim 1, further comprising:
transmitting, to a base station, a deregistration request message for disconnecting the connection to a network to enter into an idle mode; and
receiving a response message to the deregistration request from the base station.

6. The method of claim 5, wherein at least one of the deregistration request message or the deregistration response message comprises an idle mode retain information.

7. The method of claim 2, further comprising:
comparing whether an identifier included in the first message is identical to an identifier stored previously or an identifier for an emergency service included in a ranging response message received during a network entry procedure subsequent to receiving the first message.

8. The method of claim 1, further comprising:
receiving an E-MBS map message when information indicating that emergency service information is transmitted is included in the received first map message.

9. The method of claim 1, further comprising:
switching from a carrier receiving the first map message to a dedicated carrier assigned for E-MBS when the first information indicates that the emergency service information is transmitted; and
receiving an E-MBS map message through the switched carrier.

10. The method of claim 1, wherein the emergency service information parameter is an identifier for identifying the terminal that receives the emergency service information and a time region hash parameter used to determine a frame number of super frames for transmitting the emergency service information.

* * * * *